United States Patent [19]

Chow et al.

[11] Patent Number: 4,507,363

[45] Date of Patent: Mar. 26, 1985

[54] POLYOXYALKYLENEAMINE MODIFIED EPOXY COATINGS FOR CORRODED METAL SURFACES

[75] Inventors: Sui W. Chow; Donald F. Smith, Jr., both of Bridgewater, N.J.

[73] Assignee: Union Carbide Corporation, Danbury, Conn.

[21] Appl. No.: 606,885

[22] Filed: May 3, 1984

[51] Int. Cl.$^3$ .......................... B32B 15/08; B32B 27/38
[52] U.S. Cl. ...................................... 428/418; 528/99; 528/111
[58] Field of Search .................. 528/111, 99; 428/418

[56] References Cited

U.S. PATENT DOCUMENTS

| | | | |
|---|---|---|---|
| 3,257,342 | 6/1966 | Kwong | 528/111 |
| 3,316,185 | 4/1967 | Reinking | 528/111 |
| 3,380,881 | 4/1967 | Williamson et al. | 528/111 X |
| 3,462,393 | 8/1969 | Legler | 528/111 X |
| 3,496,138 | 2/1970 | Sellers et al. | 528/111 |
| 3,645,969 | 2/1972 | Harvey | 528/111 |
| 4,352,920 | 10/1982 | Kluger | 528/111 |
| 4,421,906 | 12/1983 | Waddill et al. | 528/111 |
| 4,423,170 | 12/1983 | Waddill | 528/111 X |

*Primary Examiner*—Earl A. Nielsen
*Attorney, Agent, or Firm*—Henry H. Gibson

[57] ABSTRACT

Epoxy coatings containing polyoxyalkyleneamines provide improved adhesion when applied to minimally cleaned, corroded metal surfaces.

15 Claims, No Drawings

POLYOXYALKYLENEAMINE MODIFIED EPOXY COATINGS FOR CORRODED METAL SURFACES

BACKGROUND OF THE INVENTION

1. Field of the Invention

This invention pertains to coating processes and coated products, and more particularly to production of epoxy coated, corroded metal surfaces.

2. Description of the Prior Art

Corroded metal surfaces contain deteriorated paint particles and oxidation products of the metal substrates. The painting of these corroded surfaces requires the coating composition to penetrate and bind the loose corrosion products and to adhere firmly to the underlying substrate. Coating compositions containing alkyds or drying oils provide relatively superior adhesion to such corroded surfaces. However, the durability of such coating compositions is considerably shorter than high performance coating compositions containing epoxy or vinyl resins. The epoxy and vinyl systems, while providing excellent weathering, require very clean surfaces in order to achieve the requisite adhesion. The requisite surface preparation, through such cleaning procedures as sand blasting, accounts for a major portion of the costs incurred during painting operations. Furthermore, the silicosis hazard associated with the use of sand and grit requires precautionary measures to be taken to minimize worker exposure and environmental pollution. These measures further add to the cost of surface preparation and in some instances prevent its use.

There is therefore a need for coating compositions which when applied to minimally cleaned, corroded metal surfaces provide wetting properties, as well as sufficient adhesion, to yield good protective action of the surfaces, without the need for intensive surface preparation.

Various polyepoxide coating compositions containing polyamines have been described as having general coating utility or as useful in a variety of specific applications.

U.S. Pat. No. 3,316,185 (Reinking) discloses curable polyepoxide coating compositions comprising a mixture of a polyepoxide having an epoxy equivalency of greater than 1 and a liquid glycol diamine. U.S. Pat. No. 3,380,881 (Williamson et al.) describes a curable composition comprising polyepoxide and glycol polyamine components useful to bond implosion shields to curved surfaces of television picture tubes. U.S. Pat. No. 3,496,138 (Sellers et al.) discloses adducts of polyglycol diamines and curable compositions comprising polyepoxides and such adducts, useful for coating a variety of surfaces. U.S. Pat. No. 3,257,342 (Kwong) describes curable epoxy compositions containing polyamino polyamides of diaminopolyethers and dicarboxylic acids useful for electrical insulation. U.S. Pat. No. 3,645,969 (Harvey) discloses curable polyepoxide compositions containing a mixture of polyglycol polyamine and an alkylene polyamine as curing agent, useful in coating, casting or filament winding applications. U.S. Pat. No. 4,352,920 (Kluger) discloses epoxy resin compositions containing aminoalkoxy curing agents useful in structural applications and in protective coatings. U.S. Pat. No. 4,421,906 (Waddill et al.) discloses water-based epoxy resin coating compositions containing bisphenol A type epoxy resins, modified by partial reaction with polyoxylalkyleneamines, combined with an aqueous solution of an amidopolyamine.

SUMMARY OF THE INVENTION

A process is provided for coating a corroded metal surface, such as steel containing iron oxide corrosion. The process comprises (1) applying to such surfaces a coating composition, as follows, and (2) curing said coating. The coating composition comprises:

(a) a polyepoxide, preferably a polyglycidyl ether;

(b) a polyoxyalkyleneamine having the structural formula

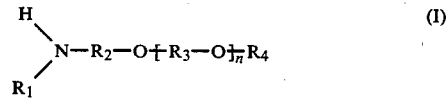

wherein:

$n$ is $\geq 1$, preferably from 1 to about 50 and most preferably n is 1 or 2;

$R_1$ is hydrogen, alkyl, aryl or aralkyl, preferably hydrogen or $C_{1-4}$ alkyl, and most preferably hydrogen;

$R_2$ is alkylene, preferably $C_{2-6}$ alkylene and most preferably ethylene or propylene;

$R_3$ is alkylene or arylene, preferably $C_{2-6}$ alkylene and most preferably ethylene or propylene;

$R_4$ is hydrogen or $-R_2-NHR_1$ wherein $R_1$ and $R_2$ are as defined previously; and (c) a polyamine curing agent.

An epoxy coated, corroded metal surface produced by such a process is also provided.

DETAILED DESCRIPTION OF THE INVENTION

It has been discovered that the use of the coating composition described herein provides an improved process for coating minimally cleaned, corroded metal surfaces. The cured coatings have been found to exhibit improved, superior adhesion, while providing superior wetting properties, when applied without intensive surface preparations.

Polyepoxides useful in this invention are those organic compounds, or mixtures thereof, having an epoxy equivalency of greater than 1, that is, compounds having an average of more than 1 epoxy group per molecule. The term "epoxy equivalency" as used in this specification refers to the average number of epoxy groups contained in the average polyepoxide molecule, and is a term well known to those skilled in the art, as described in U.S. Pat. No. 3,316,185 (Reinking). The polyepoxides are compounds wherein the oxygen of the epoxy group is attached to vicinal carbon atoms. The polyepoxides can be saturated or unsaturated, aliphatic, cycloaliphatic or heterocyclic, and can be substituted with substituents such as halogen atoms, hydroxyl groups, ether groups, and the like. The polyepoxides can be monomeric or polymeric. The epoxy groups may be in terminal or inner positions. Such polyepoxides, and processes for their preparation, are well known in the art and include those polyepoxides described in U.S. Pat. No. 3,203,920 (Nikels et al.), No. 3,280,054 (Gotez et al.), No. 4,152,285 (Thomassen), No. 4,162,244 (Bertram), and No. 4,330,644 (Allen).

Preferred polyepoxides contain terminal 1,2-epoxide groups, such as 1,2-epoxyethyl and 1,2-epoxypropyl groups. Glycidyl ether or ester groups wherein 1,2- epoxypropyl groups are linked to an oxygen atom, are preferred. Suitable polyglycidyl ethers are known compounds obtained by the alkaline condensation of epichlorohydrin with polyols. Suitable polyols for use in the present invention are polyalcohols, such as ethylene glycol, 1:4-butanediol; polyalkylene glycols; and polyhydric phenols, such as phenol novolaks or cresol novolaks, resorcinol, pyrocatechol, hydroquinone. 1:4-dihydroxynaphthalene, bis-[4-hydroxyphenyl]methylphenylmethane, bis-[4-hydroxyphenyl]tolylmethane, 4:4'-dihydroxydiphenyl, bis-[4-hydroxyphenyl]sulfone and especially 2,2'-bis(4-hydroxyphenyl)propane, i.e., bisphenol A.

Preferred polyglycidyl ethers useful in the present invention have the structural formula:

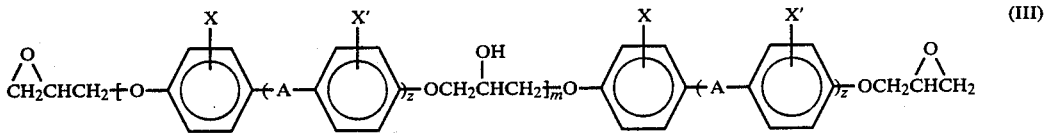

wherein:

m represents an average degree of polymerization and can have a value of from 0 to about 5, is preferably small, such as from 0.1 to about 1, to maintain low viscosity, and most preferably about 0.2.

$R_5$, $R_6$, $R_7$, $R_8$, and $R_9$ are each individually hydrogen or alkyl, preferably hydrogen or $C_{1-4}$ alkyl, and most preferably hydrogen; and $R_{10}$ is alkylene or arylene preferably $C_{2-6}$ alkylene or phenylene-containing group.

Particularly preferred polyglycidyl ethers have the average formula:

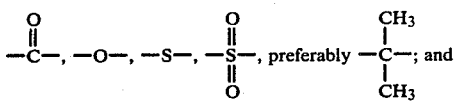

wherein:

m has an average value of from about 0 to 5, preferably an average value of 0 to about 0.2;

z is 0 or 1, preferably 1;

A is $C_{1-6}$ alkylene, cycloalkylene,

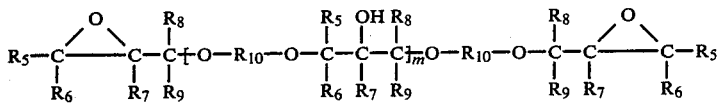

each X and X' is individually hydrogen, chlorine or bromine, preferably hydrogen.

The most preferred polyglycidyl ethers are the condensation products of bisphenol A and epichlorohydrin, which have an average molecular weight of between about 300 to about 900 and an epoxide equivalent weight of about 140 to about 500, preferably from about 170 to about 195.

Suitable polyepoxides containing an inner 1,2-epoxide group include epoxidized diolefins, dienes or cyclic dienes; epoxidized diolefinically unsaturated carboxylic acid esters, and the like. Additional suitable polyepoxides include epoxidized monoethers, diethers, polyethers, monoesters, diesters, polyesters, monoacetals, diacetals, polyacetals and epoxidized compounds containing at least one cycloaliphatic 5-membered, or 6-membered ring. Further suitable polyepoxides includes epoxidized diolefin polymers, such as homopolymers or copolymers of butadiene or cyclopentadiene and epoxidized fatty acids, fatty oils and fatty esters.

Polyoxyalkyleneamine modifiers useful in the process of this invention are compounds, or mixtures of compounds, having the structural formula:

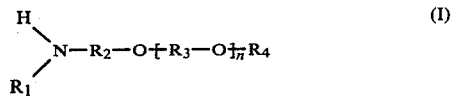

wherein:

n is $\geq 1$, preferably from 1 to about 50, and most preferably n is 1 to 2;

$R_1$ is hydrogen, alkyl, aryl or aralkyl, preferably hydrogen or $C_{1-4}$ alkyl, and most preferably hydrogen;

$R_2$ is alkylene, preferably $C_{2-6}$ alkylene, and most preferably propylene or ethylene;

$R_3$ is alkylene or arylene, preferably $C_{2-6}$ alkylene and most preferably ethylene or propylene; and $R_4$ is hydrogen, or —$R_2$—$NHR_1$ wherein $R_1$ and $R_2$ are as defined previously.

As used herein, the term "alkyl" pertains to linear or branched acyclic hydrocarbons typically having less than about 18 carbon atoms. The term "aryl" pertains to aromatic hydrocarbons typically containing at least one benzene ring, i.e., phenyl group. The term "aralkyl" pertains to alkyl substituted aromatic hydrocarbons typically containing less than about 24 carbon atoms. The terms "alkylene" and "arylene" pertain to divalent acyclic and aromatic hydrocarbons, respectively. The use of these terms accordingly is well known to those skilled in the coating art.

Such polyoxyalkyleneamines, and processes for their preparation, are well known in the art. Preferred polyoxyalkyleneamines are mono- or diamines which contain repeating oxyethylene or oxypropylene groups, or mixtures thereof. Preferred polyoxyalkyleneamines are the aminoalkyl ethers of polyethylene glycols which can be used either as pure compounds or as mixtures thereof. Particularly preferred polyoxyalkyleneamines include di-γ-aminopropyl ether of diethylene glycol (wherein n is 2, $R_1$ is hydrogen; $R_2$ is propylene; $R_3$ is ethylene and $R_4$ is —(CH$_2$)$_3$—NH$_2$ in Formula I); mono-γ-aminopropylether of diethylene glycol (wherein n is 2, $R_1$ and $R_4$ are hydrogen; $R_2$ is propylene and $R_3$ is ethylene); polypropylene glycol diamines distributed under the tradename JEFFAMINE ® by Texaco Chemical Co., (wherein n ranges from about 2 to about 25; $R_1$ is hydrogen, $R_2$ and $R_3$ are isopropylene and $R_4$ is

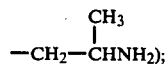

and di-γ-aminopropyl ether of butanediol (wherein n is 1, $R_1$ is hydrogen, $R_2$ is propylene; $R_3$ is butylene and $R_4$ is $-(CH_2)_3-NH_2$).

Polyamine curing agents used in the present invention are those compounds, or mixtures thereof, well known in the art including, for example, those disclosed in U.S. Pat. No. 3,380,811 (Williamson et al.) and U.S. Pat. No. 3,816,356 (Schmit et al.). Suitable polyamine curing agents include cycloaliphatic polyamines, such as, diaminocyclohexane, 4,4'-diaminodicyclohexyl methane, 3-(aminomethyl)-3,5,5-trimethyl-1-cyclohexylamine; aliphatic amines, such as monoethanolamine, ethylenediamine; aromatic amines, such as phenylenediamine, 4-4'-diaminodiphenyldimethylmethane; adducts of polyamines, in excess, and polyepoxides; and polyamines derived from aliphatic amines reacted with dimerized or trimerized unsaturated fatty acids.

Preferred polyamine curing agents are polyamidoamines distributed by Henkel Corp. under the trade names VERSAMID ® and GENAMID ®. VERSAMID ® polyamide resins are long chain polymers derived from the reaction of dimerized linoleic acid with di- or polyamines, and have been defined as condensation products of polymers of dimerized (and trimerized) vegetable oil, unsaturated fatty acids, such as linseed oil fatty acid, and aryl or alkyl polyamines.

The amounts of polyepoxide, polyoxyalkyleneamine modifier and polyamine curing agent used as the essential components in the coating composition can be varied within those ranges for such compositions well known in the art, with the proviso that the polyoxyalkyleneamine must be present in an amount sufficient to provide an improved coating composition exhibiting superior adhesion to minimally cleaned, corroded metal surfaces.

The amine (NH)/epoxide equivalent ratio is not narrowly critical. However, those skilled in the art are aware that the mechanical strength of the cure composition is dependent on the stoichiometry employed and normally, maximum strength is obtained at equivalent ratios of from about 0.9 to about 1.1.

The amount of polyoxyalkyleneamine is typically at least 0.5 wt. %, preferably from about 5 to 50 wt. %, and most preferably from about 5 to about 20 wt. %, when using those components described in the examples.

Typical amounts of polyepoxide will be between about 60–80 wt. %, preferably between about 65–75 wt. % and most preferably between about 65–68 wt. %.

Typical amounts of polyamine curing agents will be between about 15–65 wt. %, preferably between about 20–30 wt. % and most preferably between about 22–26 wt. %.

All of the above weight percentages are based on the weight of the total coating resins exclusive of pigments and other additives.

In those instances where the polyepoxide is a relatively low viscosity liquid, it may be provided as a neat solution to the coating composition. Polyepoxides which are too viscous for ready mixing in the coating composition can be heated prior to application to reduce their viscosity or liquid solvents can be added in order to provide the desired fluidity. Normally solid polyepoxides are either melted or dissolved with liquid solvents.

If desired, the viscosity of the polyepoxides can be adjusted to the desired consistency, facilitating admixing into the coating composition, by the use of reactive diluents, preferably those containing a single epoxy group. Among such suitable reactive diluents are alkylglycidyl ethers such as butyglycidyl ether, phenylglycidyl ether and the like. Such reactive diluents are typically employed in amounts from about 10 wt. % to about 15 wt. % based on the weight of the polyepoxide.

Suitable solvents for imparting the desired fluidity to highly viscous or normally solid polyepoxides are well known in the art and include ketones, such as acetone, methyl isobutyl ketone, isophorone and the like; esters such as ethyl acetate, butyl acetate, ethylene glycol monoacetate, acetate of ethylene glycol monomethyl ether, and the like; ether alcohols, such as methyl, ethyl and butyl ether of ethylene glycol or diethylene glycol; chlorinated hydrocarbons, such as trichloropropane, chloroform, and the like; aromatic hydrocarbons, such as benzene, toluene, xylene, and the like; and alcohols, such as ethyl alcohol, isopropyl alcohol, n-butylalcohol, and the like. Water could also be used as solvent for those coatings which may be formulated as aqueous dispersions or solutions.

Typical adjuvants well known in the art may be admixed with the coating compositions used in this invention. Such adjuvants may be provided in any stage before curing, using those procedures established in the art. Such optional adjuvants include extenders, fillers, reinforcing agents, bactericides, pigments, dyestuffs, solvents, flow control agents, thixotropic agents, flame proofing and flame retarding substances, plasticizers, and the like.

The coating compositions used in this invention are prepared and applied to corroded metal surfaces using coating procedures well established in the art. Such procedures typically involve admixing a two component system immediately prior to use. The polyepoxide, and optional adjuvants, comprises one component while the polyoxyalkyleneamine modifier and polyamine curing agents, along with other optional adjuvants, comprises the other component. Preparation and application of the coating composition is typically conducted under ambient temperature and pressure conditions, of greater than 0° C. and at least one atmosphere, occurring during normal use. The coating composition is then cured, typically under similar ambient conditions, to produce a hardened, dry coating on the metal substrate.

The coating composition used in this invention is applied to corroded metal surfaces without the need for exhaustive surface cleaning procedures such as sand blasting. Corroded metal surfaces which have undergone minimal cleaning, including no cleaning or treatment with, for example, a nylon brush or its mechanical equivalent, are appropriate substrates within this invention. Application of the coating compositions used in this invention to such surfaces has been found to provide unexpectedly superior coatings exhibiting superior adhesion and durability.

In a typical embodiment the epoxide component is prepared by milling an epoxide, appropriate adjuvants such as pigments, fillers, in an aromatic solvent to a fine consistency, usually a Hegman fineness of greater than 7. Separately, the hardener component comprising the polyoxyalkyleneamine, the amine curing agent and adjuvants is prepared in similar manner. The epoxide and hardeners are stored separately. Coating formulations are obtained by thoroughly mixing appropriate amounts of each of the epoxide and hardener. The resulting coating formulation can be applied to corroded metal substrates by any of the conventional techniques such as brush, roller, spray or drawdown.

Without wishing to be bound to any particular theory, it has been theorized that the loosely adhered, corrosion particles, predominantly iron oxide rust, in the substrate become incorporated into the coating compositions thereby acting as inorganic fillers which tend to increase the rigidity of the coating, resulting in increased localized stress and subsequent reduction in adhesive capacity of the coating. It is believed that the presence of the polyoxyalkyleneamines in the coating composition used in this invention, by enhancing the flexibility of the cured coating composition, permits the coating to redistribute and relieve the strain induced by processes such as thermal cycling, mechanical bending, viscoelastic deformation, and the like, thereby maintaining intimate contact with the corroded metal substrate.

It is to be understood that all the patents referred to previously in this specification are incorporated herein by reference.

The following examples further illustrate the present invention and are not intended to limit the scope thereof in any manner.

EXPERIMENTAL

The following shorthand designations represent components utilized in the Examples.

| Designation | Description |
| --- | --- |
| Curing Agent I | A polyamidoamine having an amine content of about 580–620 mg KOH/g. distributed under the trade name GENAMID ® 2000 by Henkel. |
| Curing Agent II | A polyamidoamine in about 25% butanol having an amine content of about 240–260 mg KOH/g. distributed under the trade name VERSAMID ® 280B75 by Henkel. |
| Polyepoxide I | Diglycidyl ether of bisphenol A based resins containing butyl glycidyl ether diluent and having an epoxy equivalency of 175–195. distributed under the trade name Epon ® 815 by Shell Chemical Co. |
| Polyoxyalkyleneamine I | Di-$\gamma$-aminopropyl ether of diethylene glycol. |
| Polyoxyalkyleneamine II | Mono-$\gamma$-aminopropyl ether of diethylene glycol. |
| Polyoxyalkyleneamine III | Mixture containing 75 wt. % of Polyoxyalkyeneamine I and 25 wt. % Polyoxyalkyleneamine II. |
| Polyoxyalkyleneamine IV | Mixture of di-$\gamma$-aminopropyl ethers of polypropylene glycols distributed under the trade name JEFFAMINE ® D-230 by Texaco Chemical Co. |
| Polyoxyalkyleneamine V | Mixture of di-$\gamma$-aminopropyl ethers of polypropylene glycols distributed under the trade name JEFFAMINE ® D-400 by Texaco Chemical Co. |

EXAMPLES 1–11 AND CONTROL EXAMPLES A & B

Preparation of Epoxy Coating Compositions

Control Example A

An epoxy coating composition was prepared by mixing 20 g. of a 66 wt % solution of Polyepoxide I in toluene with 15 g. of a hardener solution containing about 5.19 milli-equivalents (i.e. meq.) of NH per g. of solution. The hardener solution was prepared by dissolving a mixture of 3.6 g. Curing Agent I and 49.7 g. Curing Agent II in 46.7 g. butanol.

Control Example B

An epoxy coating composition was prepared similar to the procedure set forth in Example A except that the proportion of polyepoxide to curing agents was modified to provide an amine/epoxide equivalent ratio of 1.37.

Example 1

An epoxy coating composition was prepared following the procedure in Control Example A except that 10 weight percent Polyoxyalkyleneamine I was provided in the coating formulation. About 20 g. of the 66% Polyepoxide I in toluene was thoroughly mixed with 10.2 g. of hardener solution which contained about 19.2 wt. % of the Polyoxyalkyleneamine I, 2.9 wt. % Curing Agent I and 40.2 wt. % Curing Agent II in butanol to provide an NH content of about 7.7 meq./g. of solution.

Example 2

An epoxy coating composition was prepared following the procedure set forth in Example 1 except that the amount of Polyoxyalkyleneamine I was reduced to provide a composition containing 7.5 wt. % Polyoxyalkyleneamine I. The hardener solution contain 13.2 wt. % of Polyoxyalkyleneamine I, 3.1 wt. % Curing Agent I and 43.1 et. % Curing Agent II to provide 6.94 meq. NH/g. of solution.

Example 3

An epoxy coating composition was prepared following the procedure set forth in Example 1 except that the amount of Polyoxyalkyleneamine I was reduced to provide a composition containing 5 wt. % Polyoxyalkyleneamine I. The hardener solution contained 8.1 wt % Polyoxyalkyleneamine I, 3.3 wt. Curing Agent I and 45.7 wt. % Curing Agent II in butanol to provide 5.59 meq. NH/g. of solution.

Example 4

An epoxy coating composition was prepared following the procedure set forth in Example 1 except that the Polyoxyalkyleneamine I was replaced with Polyoxyalkyeneamine II sufficient to provide 10 wt. % of polyoxyalkyleneamine in the coating composition. The hardener solution contained about 16.9 wt. % of Polyoxyalkyleneamine II, 3 wt. % Curing Agent I and 41.6 wt. % Curing Agent II in butanol to give about 6.39 meq. NH/g. of solution. The coating solution was then prepared by mixing the 66% Polyepoxide I solution with the hardener solution in proportions such that the coating solution had an NH/epoxide equivalent ratio of 1.09.

Example 5

An epoxy coating composition was prepared following the procedure set forth in Example 1 except that the Polyoxyalkyleneamine I was replaced with Polyoxyalkyeneamine III sufficient to provide 10 wt. % polyoxyalkyleneamine. The hardener solution contained about 18.7 wt. % Polyoxyalkyleneamine III, 2.9 wt. % Curing Agent I and 40.4 wt. % Curing Agent II in butanol to provide 7.36 meq. NH/g. of solution. This hardener solution was used with the 66% Polyepoxide I solution.

Example 6

An epoxy coating composition was prepared following the procedure set forth Example 5 except that the amount of Polyoxyalkyeneamine III was reduced to provide 7.5 wt. % polyoxyalkyeneamine. The coating solution was prepared from 20 g. of the 66% Polyepoxide I in toluene and 11.6 g. of the hardener solution containing 13 wt. % Polyoxyalkyleneamine III, 3.1 wt. % Curing Agent I and 43.2 wt. % Curing Agent II. The hardener solution had an NH content of about 6.7 meq. per g. of solution.

Example 7

An epoxy coating composition was prepared following the procedure set forth in Example 1 except that the Polyoxyalkyleneamine I was replaced with Polyoxyalkyeneamine IV sufficient to provide 10 wt. % polyoxyalkyleneamine. The coating solution was prepared from 20 g. of the 66 % Polyepoxide I in toluene and 13.64 g. of a hardener solution in butanol which contained 15.7 wt % of Polyoxyalkylene IV, 3.3 wt. % Curing Agent I and 41.9 wt. % Curing Agent II. The hardener solution had an NH content of about 5.7 meq./g. of solution.

Example 8

An epoxy coating composition was prepared following the procedure set forth in Example 1 except that the Polyoxyalkyleneamine I was replaced with Polyoxyalkyeneamine V sufficient to provide 10 wt. % polyoxyalkyleneamine. The coating solution was prepared from 20 g. of the 66% Polyepoxide V in toluene and 15.02 g. of a hardener solution in butanol which contained about 14.8 wt. % Polyoxyalkyleneamine V, 3.1 wt. % of Curing Agent I and 43.2 wt. % Curing Agent II. The NH content of the hardener was about 5.2 meq./g. of solution.

Example 9

An epoxy coating composition was prepared following the procedure set forth in Control Example B except that a sufficient amount of Polyoxyalkyleneamine I was added to provide 8 wt. % polyoxyalkyleneamine I by mixing 15 g. of a 66% Polyepoxide I in toluene with 11.5 g. of the hardener solution in butanol. The hardener contained 10.4 wt. % Polyoxyalkyleneamine I, 3.2 wt. % of Curing Agent I and 44.5 wt. % Curing Agent II. The NH/epoxide equivalent ratio of the resulting composition was 1.36.

Example 10

An epoxy coating composition was prepared following the procedure set forth in Example 9 except that the amount of Polyoxyalkyleneamine I was increased to provide 12 wt. % polyoxyalkyleneamine. The coating solution was obtained by mixing 15 g. of a 66% Polyepoxide I in toluene and 10.4 g. of a hardener solution containing about 16.4 wt. % Polyoxyalkyleneamine I, 3 wt. % Curing Agent I and 41.6 wt. % Curing Agent II in butanol. The NH/epoxide equivalent ratio of the resulting composition was 1.36.

Example 11

An epoxy coating composition was prepared following the procedure set forth in Example 9 except that the amount of Polyoxyalkyleneamine I was increased to provide 24 wt. % polyoxyalkyleneamine. The coating formulation was prepared from 20 g. of a 66% Polyepoxide I in toluene and 18.5 g. of hardener solution in butanol containing 26 wt. % Polyoxyalkyleneamine I, 2.7 wt. % of Curing Agent I and 36.8 wt. % Curing Agent II in butanol. The epoxy coatings so produced had an NH/epoxide equivalent ratio of 2.1.

EXAMPLES 12–17 AND CONTROL EXAMPLE C

Preparation of Epoxy Coating Based Paints

Control Example C

A two-package epoxy paint was prepared according to following formulations:

|  | Wt. % |
|---|---|
| A. Hardener Component: | |
| Baker Castor Oil | 0.42 |
| Curing Agent I | 1.68 |
| Curing Agent II | 23.53 |
| Magnesium silicate | 42.02 |
| Titanium dioxide | 8.40 |
| Butanol | 22.18 |
| Copper phthalocyanine blue | 1.0 |
| Yellow iron oxide | 1.68 |
| B. Epoxy Component: | |
| Baker Caster Oil | 0.49 |
| Polyepoxide I | 49.36 |
| Magnesium silicate | 9.87 |
| Toluene | 25.47 |
| CELITE ® 289 | 14.81 |

Each were ground in a media mill to a Hegman fineness of greater than 7. Coating compositions were then prepared by mixing 118 g. of the hardener component with 100 g. of the epoxy resin component.

Example 12

Polyoxyalkyleneamine I modified hardener component was prepared by adding 11.24 g. of the polyoxyalkyleneamine to 100 g. of the hardener component described in Control Example C. A coating formulation was obtained by admixing 71.8 g. of the modified hardener component with 100 g. of the epoxy component described in Control Example C. The resulting composition contained about 10 wt. % of the polyoxyalkyleneamine with respect to the binder resin. Coatings were prepared as described in Control Example C.

Example 13

Polyoxyalkyleneamine I modified hardener was prepared by adding 7.2 g. of the polyoxyalkyleneamine to 100 g. of the hardener component described in Control Example C. Coating composition was obtained by admixing 82.6 g. of the modified hardener with 100 g. of the epoxy component described in Control Example C. The resulting paint contained about 7.5 wt. % of the polyoxyalkyleneamine in the binder resin. Coatings were prepared as in Control Example C.

Example 14

The hardener component was prepared by adding 3.62 g. of the Polyoxyalkyleneamine I to 91.45 g. of the hardener described in Control Example C. A coating composition was made by mixing 95.1 g. of the modified hardener with 100 g. of the epoxy component. The resulting formulation had about 5 wt. % of the polyoxyalkyleneamine in the binder resin. Coatings were prepared as described in Control Example C.

Example 15

The hardener component was prepared by adding 7.03 g. of the Polyoxyalkyleneamine II to 83.2 g. of the hardener described in Control Example C. The coating composition was obtained by admixing 90.2 g. of the modified hardener with 100 g. of the epoxy component described in Control Example C. The resulting coating formulation contained about 10 wt. % of the polyoxyalkyleneamine in the binder resin.

Example 16

Polyoxyalkyleneamine III (5.7 g.) was added to 80 g. of the hardener component described in Control Example C. The modified hardener was then mixed with 100 g. of the epoxy resin component to give the coating composition. The binder resin of the coating composition contained 7.5 wt. % of the polyoxyalkyleneamine.

Example 17

Polyoxyalkyleneamine IV (5.7 g.) was added to 80 g. of the hardener component described in Control Example C. The modified hardener was then mixed with 100 g. of the epoxy resin component to give the coating composition. The binder resin of the coating composition contained 7.5 wt. % of the polyoxyalkyleneamine.

EXAMPLES 18-36 AND CONTROL EXAMPLES D-G

Epoxy Coating On Corroded Surfaces

The epoxy coating compositions prepared in Examples 1-11 and Control Examples A & B were applied to corroded metal surfaces produced by the following procedure.

The adhesive strength to corroded steel surfaces was evaluated for the epoxy formulations indicated in Tables I, II and III. The evaluations were conducted using the cross-cut tape peel method known to those skilled in the art as ASTM D 3359. Rust-covered, 4"×12" cold-rolled steel panels containing about 0.5-2 mil corrosion products were obtained by corrosion in a weatherometer. The panels were divided into four areas that were cleaned with nylon, brass, steel-bristled brushes and an "as is" reference section. A clear film having a 1.5-5 mil thickness was then applied to the corroded metal surfaces by drawdown followed by curing under either ambient conditions for about a week, or under ambient conditions for about 30 minutes and then curing at 120° C. for 20-30 minutes. Cross cuts of the panels were made using a six-bladed cutter to provide a test pattern of a group of 2×2 mm squares.

The rust type set forth in the Tables indicates the type of rust corrosion with red rust indicating the presence of dry ferric oxide. $Fe_2O_3$; and wherein yellow rust indicates the presence of hydrated ferric oxide, $Fe_2O_3 \cdot nH_2O$.

The adhesion test results demonstrate that significantly improved adhesion is obtained for coating compositions containing polyoxyalkyleneamine modifiers when applied to minimally cleaned corroded surfaces, such as those which have undergone no preparative cleaning or minimal cleaning using nylon, or often brass, brushing.

TABLE I

ADHESION OF CLEAR EPOXY COATINGS ON CORRODED SURFACES

| Example | Coating from Example | Polyoxyalkylene Modifier (Wt. %) | Rust Type | Adhesion Test Results[1] | | | |
|---|---|---|---|---|---|---|---|
| | | | | No Cleaning | Nylon Brush | Brass Brush | Steel Brush |
| Control D | A | None | Red | 1 | 1 | 4 | 5 |
| 18 | 1 | I (10%) | Red | 3 | 3 | 5 | 5 |
| 19 | 4 | II (10%) | Red | 3 | 3 | 5 | 5 |
| Control E | A | None | Red | 2 | 3 | 4 | 5 |
| 20 | 1 | I (10%) | Red | 3 | 3 | 5 | 5 |
| 21 | 2 | I (7.5%) | Red | 3 | 3 | 4 | 5 |
| 22 | 3 | I (5%) | Red | 2 | 3 | 4 | 5 |
| 23 | 4 | II (10%) | Red | 3 | 3 | 4 | 5 |
| 24 | 7 | IV (10%) | Red | 3 | 3 | 4 | 5 |
| 25 | 8 | V (10%) | Red | 3 | 3 | 4 | 5 |
| Control F | A | None | Yellow | 0 | 0 | 5 | 5 |
| 26 | 1 | I (10%) | Yellow | 3 | 3 | 5 | 5 |
| 27 | 2 | I (7.5%) | Yellow | 2 | 3 | 5 | 5 |
| 28 | 3 | I (5%) | Yellow | 1 | 2 | 5 | 5 |
| 29 | 4 | II (10%) | Yellow | 2 | 3 | 5 | 5 |
| 30 | 5 | III (10%) | Yellow | 2 | 3 | 5 | 5 |
| 31 | 6 | III (7.5%) | Yellow | 2 | 2 | 5 | 5 |
| 32 | 7 | IV (10%) | Yellow | <1 | 1 | 5 | 5 |
| 33 | 8 | V (10%) | Yellow | <1 | 1 | 5 | 5 |
| Control G | B | None | Red | 2 | 3 | 3 | 5 |
| 34 | 9 | I (8%) | Red | 4 | 5 | 5 | 5 |
| 35 | 10 | I (12%) | Red | 4 | 5 | 5 | 5 |
| 36 | 11 | I (24%) | Red | 4 | 5 | 5 | 5 |

[1] 5 — No delamination
4 — <5% area detached
3 — 5-15% area detached
2 — 15-30% area detached
1 — 30-65% area detached
0 — >65% area detached

EXAMPLES 38–46 AND CONTROLS J-L

Epoxy Paints On Corroded Surfaces

Epoxy paint formulations produced in Examples 12–17 and Control Example C were applied to corroded steel surfaces and tested for adhesion, using those procedures set forth previously for Examples 8–37 and Control Examples D-G, with the results set forth in Table II.

Similar to the results in Table I, the presence of polyoxyalkyleneamine modifiers provided an overall improvement in adhesion of such paints to corroded surfaces. Significant adhesion improvement was provided in Examples 44–46, as compared to Control Example L, for corroded surfaces subjected to salt spray weathering.

TABLE II

ADHESION OF CLEAR EPOXY COATINGS ON CORRODED SURFACES

| Example | Coating from Example | Polyoxyalkylene Modifier (Wt. %) | Rust Type | Adhesion Test Results[1] | | | |
|---|---|---|---|---|---|---|---|
| | | | | No Cleaning | Nylon Brush | Brass Brush | Steel Brush |
| Control J | C | None | Yellow | 1 | 3 | 5 | 5 |
| 38 | 16 | III (10%) | Yellow | 4 | 4 | 5 | 5 |
| 39 | 17 | III (7.5%) | Yellow | 3 | 4 | 5 | 5 |
| Control K | C | None | Red | 2 | 3 | 4 | 5 |
| 40 | 12 | I (10%) | Red | 3 | 3 | 4 | 5 |
| 41 | 13 | I (7.5%) | Red | 3 | 3 | 4 | 5 |
| 42 | 16 | III (10%) | Red | 4 | 4 | 5 | 5 |
| 43 | 17 | III (7.5%) | Red | 4 | 4 | 4 | 5 |
| Control L | C | None | Red | $4(1)^2$ | — | $5(4)^2$ | — |
| 44 | 12 | I (10%) | Red | $4(4)^2$ | — | $5(4)^2$ | — |
| 45 | 14 | I (5%) | Red | $(4)^2$ | — | $(4)^2$ | — |
| 46 | 15 | II (10%) | Red | $(3)^2$ | — | $(3)^2$ | — |

[1] 5 — No delamination
4 — <5% area failure
3 — 5–15% area failure
2 — 35–65% area failure
1 — 35–65% area failure
0 — >65% area failue
[2] Values in parentheses are adhesion ratings measured after the Coating has been exposed to 1000 hours of salt spray following ASTM B117 procedures.

EXAMPLES 47–48 AND CONTROL EXAMPLES M-N

Mastic Paint Formulation Analysis

The utility of the polyoxyalkyleneamine modified epoxy hardener in a mastic formulation was also investigated. Improvements both in blister and corrosion resistances were obtained for polyoxyalkyleneamine modified formulations when compared with the corresponding unmodified formulations.

Example 47

A hardener component was prepared from 27 g. of a butanol solution containing 19.2 wt. % Polyoxyalkyleneamine I, 3 wt. % of Curing Agent I 41 wt. % Curing Agent II and 17 g. of pigments isolated from the hardener for CARBOMASTIC ® 15 formulation, distributed by Carboline Inc., by centrifugation and washing with toluene. The resulting polyoxyalkyleneamine modified hardener had an NH content of about 4.76 meq./g. of the hardener. This hardener was mixed with 100 g. of the epoxy component of the CARBOMASTIC ® 15 to give the coating composition. Films were made by drawdown, air dried for 30 min. and then cured at 120° C. for 20–30 min.

Control Example M

Reference coatings were made from CARBOMASTIC ® 15 as supplied following the manufacturer's instruction except that the curing was carried out at 120° C. for 20–30 min. The results of a salt spray analysis as shown in Table III.

Example 48

A hardener component was prepared from 28 g. of butanol solution containing 19.2 wt. % of Polyoxyalkyleneamine I, 3 wt. % of Curing Agent I, 41 wt. % of Curing Agent II and 17 g. of the pigments isolated from the hardener component of ALUMAPOXY ® mastic paint, distributed by Mobil Chemical Co. The isolation of the pigments was accomplished by dilution with ethanol and then centrifugation. The resulting pigments were washed with additional ethanol and vacuum dried at room temperature. This modified hardener was then mixed with 100 g. of epoxy component of ALUMAPOXY ® to give the coating composition. A film on corroded steel substrates was made by drawdown air dried for 30 min. and then cured at 120° C. for 20–30 min.

Control Example N

Reference coatings were made from the ALUMAPOXY ® as supplied following the manufacturer's instruction except that curing was carried out at 120° C. for 20–30 minutes.

The results of salt spray analysis are shown in Table III.

TABLE III

POLYOXYALKYLENEAMINE IN MASTIC FORMULATIONS: SALT SPRAY RESISTANCE

| Example | Coating Composition | No Cleaning | | Brass Brushed | |
|---|---|---|---|---|---|
| | | Blister[1] | Corrosion[2] | Blister[1] | Corrosion[1] |
| Control M | CARBOMASTIC ® 15 | 6F | 7 | 6M | 7 |
| 47 | Polyoxyalkyleneamine I Modified CARBOMASTIC ® 15 | 6F | 10 | 6F | 10 |
| Control N | ALUMAPOXY ® | 6M | 4 | 4M | 5 |

TABLE III-continued

POLYOXYALKYLENEAMINE IN MASTIC FORMULATIONS: SALT SPRAY RESISTANCE

| Example | Coating Composition | No Cleaning | | Brass Brushed | |
|---|---|---|---|---|---|
| | | Blister[1] | Corrosion[2] | Blister[1] | Corrosion[1] |
| 48 | Polyoxyalkyleneamine I Modified ALUMAPOXY ® | 8F | 7 | 6F | 9 |

[1] Blister rating values range from 1–10 with 10 being the smallest blister; and wherein D = dense, M = medium dense, F = a few blisters.
[2] Corrosion rating values range from 1–10 with 10 referring to no corrosion.

What is claimed is:

1. A process for coating a corroded metal surface comprising:
   (1) applying to said surface a coating composition which comprises:
   (a) a polyepoxide;
   (b) a polyoxyalkyleneamine having the structural formula:

$$\begin{array}{c} H \\ \diagdown \\ N-R_2-O+R_3-O\!\!\!+_n\!R_4 \\ \diagup \\ R_1 \end{array}$$

wherein:
   n is $\geq 1$;
   $R_1$ is hydrogen, alkyl, aryl or aralkyl;
   $R_2$ is alkylene;
   $R_3$ is alkylene or arylene; and
   $R_4$ is hydrogen or $-R_2-NHR_1$ wherein $R_1$ and $R_2$ are as defined previously; and
   (c) a polyamine curing agent; and
   (2) curing said coating.

2. The process of claim 1 wherein n is between 1 to about 50; $R_1$ is hydrogen or $C_{1-4}$ alkyl; $R_2$ is $C_{2-6}$ alkylene; and $R_3$ is $C_{2-6}$ alkylene.

3. The process of claim 2 wherein n is 1 or 2; $R_1$ is hydrogen; each $R_2$ and $R_3$ is individually propylene; and $R_4$ is $-(CH_2)_3-NH_2$.

4. The process of claim 3 wherein the polyoxyalkyleneamine is the di-Γ-aminopropyl ether of diethylene glycol, the mono-γ-aminopropyl ether of diethylene glycol, or mixtures thereof.

5. The process of claim 1 wherein the coating composition contains at least 0.5 wt. % of said polyoxyalkyleneamine, based on the total weight of the coating resins.

6. The process of claim 5 wherein said polyoxyalkyleneamine is present in an amount of between 5 to 50 wt. %.

7. The process of claim 6 wherein the polyoxyalkyleneamine is present in an amount of between 5 to 20 wt. %.

8. The process of claim 1 wherein the polyepoxide is a polyglycidyl ether.

9. The process of claim 8 wherein the polyglycidyl ether has the formula:

$$R_5\!-\!\underset{R_6}{\overset{O}{\diagup\!\!\!\!\diagdown}}\!C\!-\!\underset{R_7}{\overset{R_8}{\underset{|}{C}}}\!-\!\underset{R_9}{\overset{|}{C}}\!+\!O\!-\!R_{10}\!-\!O\!-\!\underset{R_6}{\overset{R_5}{\underset{|}{C}}}\!-\!\underset{R_7}{\overset{OH}{\underset{|}{C}}}\!-\!\underset{R_9}{\overset{R_8}{\underset{|}{C}}}\!\!\!+_m\!O\!-\!R_{10}\!-\!O\!-\!\underset{R_9}{\overset{R_8}{\underset{|}{C}}}\!-\!\underset{R_7}{\overset{|}{C}}\!\overset{O}{\diagup\!\!\!\!\diagdown}\!C\!-\!\underset{R_6}{\overset{|}{R_5}}$$

wherein:
   m is an average of from 0 to about 5;
   $R_5$, $R_6$, $R_7$, $R_8$ and $R_9$ are each individually hydrogen or alkyl; and
   $R_{10}$ is alkylene or arylene.

10. The process of claim 9 wherein the polyglycidyl ether has the formula:

$$\underset{CH_2CHCH_2}{\overset{O}{\diagup\!\!\!\!\diagdown}}\!\!+\!O\!-\!\!\bigcirc\!\!-\!\!(A\!-\!\!\bigcirc)\!\!-\!_z\!OCH_2\overset{OH}{\underset{|}{C}}HCH_2\!+\!_m\!O\!-\!\!\bigcirc\!\!-\!(A\!-\!\!\bigcirc)\!\!-\!_z\!OCH_2\overset{O}{\diagup\!\!\!\!\diagdown}CHCH_2$$

with X, X' substituents on the rings.

wherein:
   m has an average value of between about 0.1 to about 0.6;
   z is 0 or 1;
   A is $C_{1-6}$ alkylene, cycloalkylene, $$-\overset{O}{\underset{}{\overset{\|}{C}}}-,\ -O-,\ -S-,\ -\overset{O}{\underset{O}{\overset{\|}{\underset{\|}{S}}}}-\ \text{or}\ -\overset{CH_3}{\underset{CH_3}{\overset{|}{\underset{|}{C}}}}-;$$

and each X and X' is individually hydrogen, chlorine or bromine.

11. The process of claim 10 wherein m is about 0.2; z is 1; A is $$-\overset{CH_3}{\underset{CH_3}{\overset{|}{\underset{|}{C}}}}-;$$

and X and X' are hydrogen.

12. The process of claim 1 wherein the polyamine curing agent is a polyamidoamine.

13. The process of claim 12 wherein the polyamidoamine is the reaction product of an aliphatic polyamine and dimerized or trimerized linseed oil fatty acid.

14. An epoxy coated, corroded metal surface produced by the process of claim 1.

15. In an improved process for coating a corroded metal surface comprising:
   (1) applying to said surface a coating composition which comprises: (a) a epoxide; and (b) a polyamine curing agent; and
   (2) curing said coating; the improvement which comprises providing said coating composition with a polyoxyalkyleneamine having the structural formula:

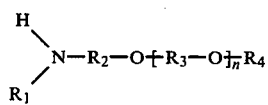
wherein:
n is $\geq 1$;
$R_1$ is hydrogen, alkyl, aryl or aralkyl;
$R_2$ is alkylene;
$R_3$ is alkylene or arylene; and
$R_4$ is hydrogen or $-R_2-NHR_1$ wherein $R_1$ and $R_2$ are as defined previously.
* * * * *